United States Patent
Baiju

(10) Patent No.: US 12,448,051 B2
(45) Date of Patent: Oct. 21, 2025

(54) PILLAR CONSTRUCTION

(71) Applicant: HONDA MOTOR CO., LTD., Tokyo (JP)

(72) Inventor: Kodai Baiju, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 438 days.

(21) Appl. No.: 18/174,891

(22) Filed: Feb. 27, 2023

(65) Prior Publication Data
US 2023/0286591 A1  Sep. 14, 2023

(30) Foreign Application Priority Data
Mar. 10, 2022 (JP) ................. 2022-036755

(51) Int. Cl.
| | |
|---|---|
| *B62D 25/04* | (2006.01) |
| *B60R 22/24* | (2006.01) |
| *B62D 21/15* | (2006.01) |
| *B60R 22/34* | (2006.01) |

(52) U.S. Cl.
CPC .............. *B62D 25/04* (2013.01); *B60R 22/24* (2013.01); *B62D 21/157* (2013.01); *B60R 2022/3402* (2013.01)

(58) Field of Classification Search
CPC ........ B62D 25/04; B62D 22/24; B62D 22/34; B62D 21/157; B62D 2022/3402
USPC ........... 296/193.06, 29, 30, 187.12; 280/807, 280/808
See application file for complete search history.

(56) References Cited

U.S. PATENT DOCUMENTS

| | | | |
|---|---|---|---|
| 10,532,773 B2 * | 1/2020 | Lee ..................... | B62D 25/025 |
| 11,718,350 B2 * | 8/2023 | Hasegawa ............ | B62D 27/023 |
| | | | 296/203.03 |
| 2014/0284967 A1 | 9/2014 | Torii | |
| 2014/0339855 A1 | 11/2014 | Torii | |
| 2017/0080979 A1 | 3/2017 | Sato et al. | |

(Continued)

FOREIGN PATENT DOCUMENTS

| | | |
|---|---|---|
| CN | 103796906 A | 5/2014 |
| CN | 107031731 A | 8/2017 |

(Continued)

OTHER PUBLICATIONS

Chinese Office Action received in corresponding Chinese application No. 202310176361.0 dated Jul. 24, 2025 with English translation (15 pages).

*Primary Examiner* — Dennis H Pedder

(74) *Attorney, Agent, or Firm* — Rankin, Hill & Clark LLP

(57) ABSTRACT

A pillar construction includes: a pillar including a pillar inner and a pillar outer forming a closed cross section; a retractor disposed at a lower portion of the pillar; and a first reinforcement member and a second reinforcement member disposed at the pillar outer, the first reinforcement member being disposed at a position coinciding with the pillar outer in a side view, the second reinforcement member being disposed higher than the retractor. The first reinforcement member and the second reinforcement member are disposed apart from each other in a vehicle up-down direction. The pillar outer includes a first deformation part which is provided between the first reinforcement member and the second reinforcement member and deformable upon input of side collision load.

7 Claims, 8 Drawing Sheets

(56) References Cited

U.S. PATENT DOCUMENTS

| | | | |
|---|---|---|---|
| 2018/0244319 A1 | 8/2018 | Kiyoshita et al. | |
| 2020/0102016 A1 | 4/2020 | Hoshuyama et al. | |
| 2020/0353989 A1 | 11/2020 | Sakai | |

FOREIGN PATENT DOCUMENTS

| | | | |
|---|---|---|---|
| CN | 108502021 A | 9/2018 | |
| CN | 110949529 A | 4/2020 | |
| CN | 111907602 A | 11/2020 | |
| JP | H9-254809 A | 9/1997 | |
| JP | 2013-91458 A | 5/2013 | |
| JP | 5673851 B2 | 2/2015 | |

* cited by examiner

FIG. 6A
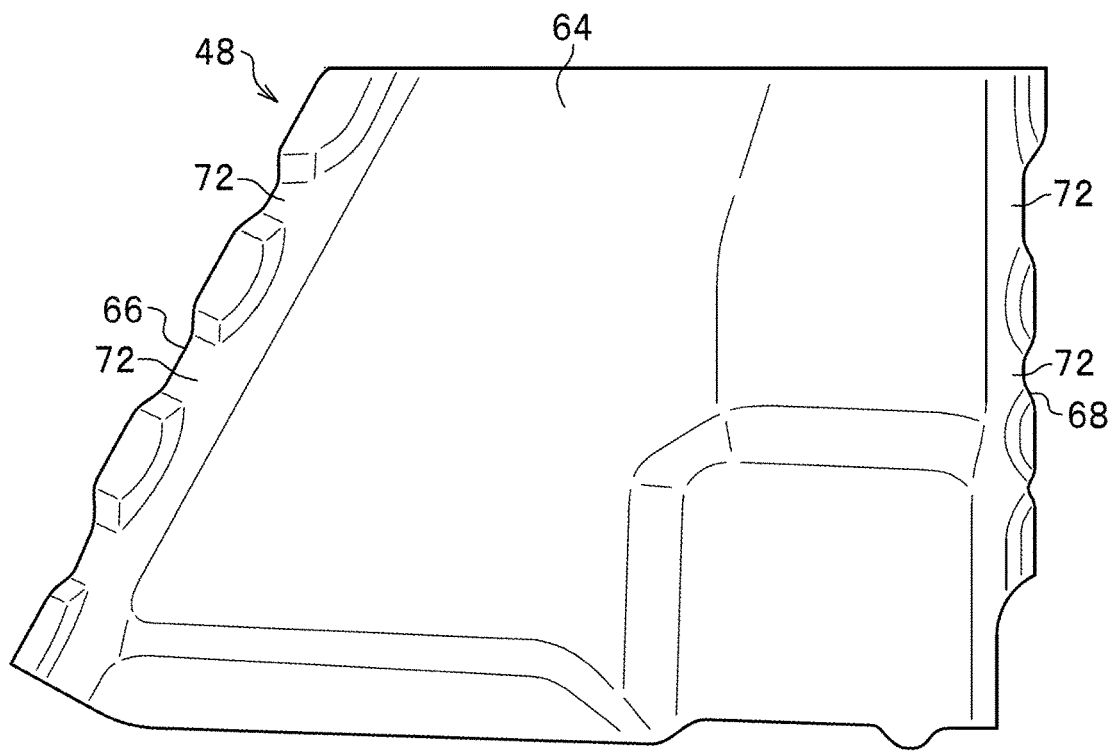
FIG. 6B
FIG. 6C
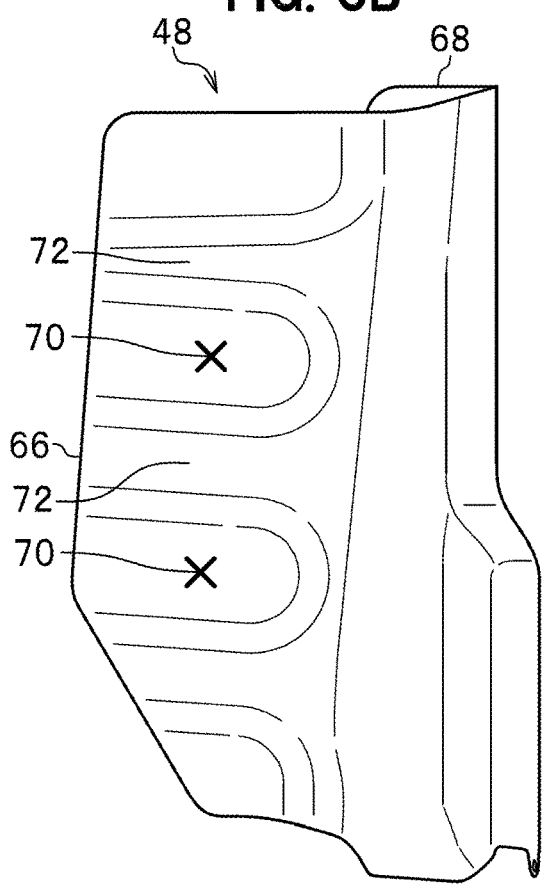
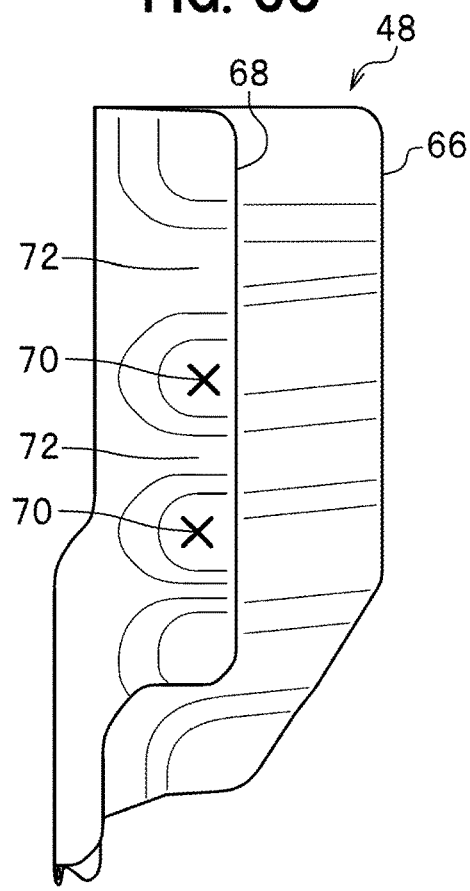

PILLAR CONSTRUCTION

CROSS REFERENCE TO RELATED APPLICATIONS

This application claims the benefit of foreign priority to Japanese Patent Application No. 2022-036755, filed on Mar. 10, 2022, which is incorporated by reference in its entirety.

BACKGROUND

1. Field of the Disclosure

The present disclosure relates to a pillar construction in a vehicle such as an automobile.

2. Description of the Related Art

The patent document of JP5673851B, for example, discloses a pillar construction such that a retractor is disposed at a lower portion of a center pillar, and a front slanting portion of a retractor connection portion is slanted more relative to an inner panel of the center pillar than a rear slanting portion of the retractor connection portion.

This patent document is stating that employing such a pillar construction makes falling over of the center pillar and breaking of the center pillar less likely upon input of side collision load.

However, with the pillar construction disclosed in the patent document, a hinge reinforcement disposed outward of the retractor in the vehicle width direction to reinforce the position where the retractor is disposed may push the retractor to the vehicle interior inner side upon input of side collision load and increase the amount of displacement of the retractor to the vehicle interior inner side.

SUMMARY

The present disclosure has been made in view of the above point and is directed to a pillar construction capable of reducing the amount of displacement of a retractor to the vehicle interior inner side upon input of side collision load.

An aspect of the disclosure provides a pillar construction which includes: a pillar including a pillar inner and a pillar outer forming a closed cross section; a retractor disposed at a lower portion of the pillar; and a first reinforcement member and a second reinforcement member disposed at the pillar outer, the first reinforcement member being disposed at a position coinciding with the retractor in a side view and the second reinforcement member being disposed higher than the retractor. The first reinforcement member and the second reinforcement member are disposed apart from each other in a vehicle up-down direction. The pillar outer includes a first deformation part which is provided between the first reinforcement member and the second reinforcement member and deformable upon input of side collision load.

The present disclosure achieves a pillar construction capable of reducing the amount of displacement of a retractor to the vehicle interior inner side upon input of side collision load.

BRIEF DESCRIPTION OF THE DRAWINGS

FIG. 6A is a front view of the first reinforcement member, FIG. 6B is a left side view of the first reinforcement member, and FIG. 6C is a right side view of the first reinforcement member.

DESCRIPTION OF THE EMBODIMENTS

Figure 1:
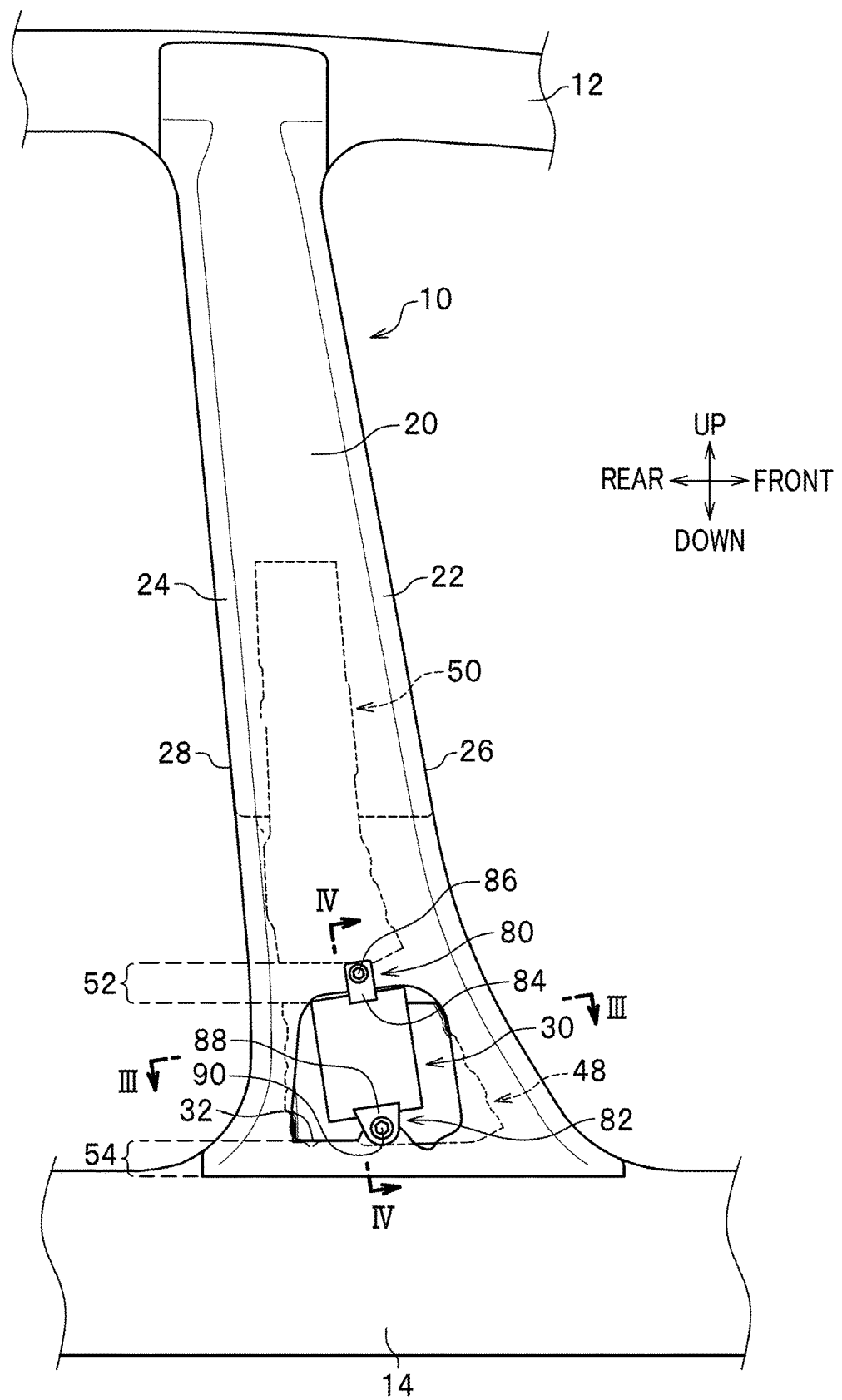
FIG. 1 is a partially transparent side view of a center pillar employing a pillar construction according to an embodiment of the present disclosure as seen from the vehicle interior inner side.

Next, an embodiment of the present disclosure is described in detail with reference to the drawings where necessary. Note that in the drawings, "front-rear" indicates a vehicle front-rear direction, "left-right" indicates a vehicle width direction (left-right direction), and "up-down" indicates the vehicle up-down direction (vertical up-down direction).

As shown in FIG. 1, a left center pillar 10 employing a pillar construction according to the present embodiment is disposed at a center part in the vehicle front-rear direction and extends upright in the vehicle up-down direction. The upper end portion of the center pillar 10 is linked to a roof side rail 12 of the vehicle. Also, the lower end portion of the center pillar 10 is linked to a side sill 14 extending in the vehicle front-rear direction.

Figure 3:
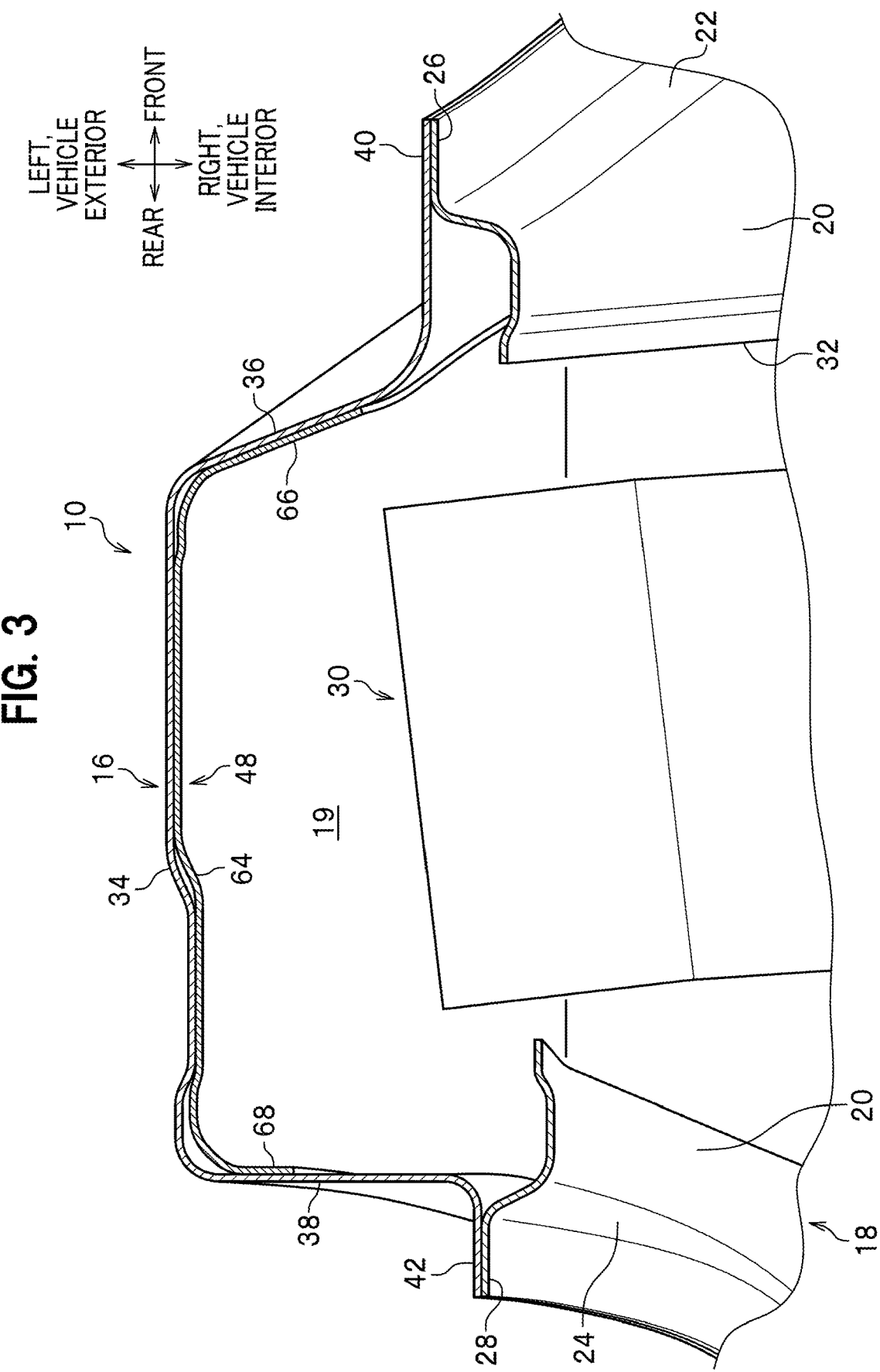
FIG. 3 is a partially sectional perspective view of the center pillar showing a part where the retractor is disposed.

As shown in FIG. 3, the center pillar 10 is includes a pillar outer 16 disposed on the outer side of the center pillar 10 in the vehicle width direction and a pillar inner 18 disposed on the inner side of the center pillar 10 in the vehicle width direction. The pillar outer 16 and the pillar inner 18 are each shaped as a hat in a cross section perpendicular to the axis and are integrally joined at flanges to be described later (a front flange 26, a rear flange 28, a front flange 40, and a rear flange 42), forming a closed cross section 19 (see FIG. 3).

As shown in FIGS. 1 and 3, the pillar inner 18 includes: a side wall 20 extending in the vehicle up-down direction and facing the vehicle interior inner side; a front wall 22 bending from the vehicle front end of the side wall 20 inward in the vehicle width direction; a rear wall 24 bending from the vehicle rear end of the side wall 20 inward in the vehicle width direction; the front flange 26 extending from the inner end, in the vehicle width direction, of the front wall 22 toward the vehicle front and joined to the pillar outer 16; and the rear flange 28 extending from the inner end, in the vehicle width direction, of the rear wall 24 toward the vehicle rear and joined to the pillar outer 16. A substantially rectangular opening portion 32 for inserting a retractor 30 is provided in a lower portion of the side wall 20 of the pillar inner 18.

Figure 2:
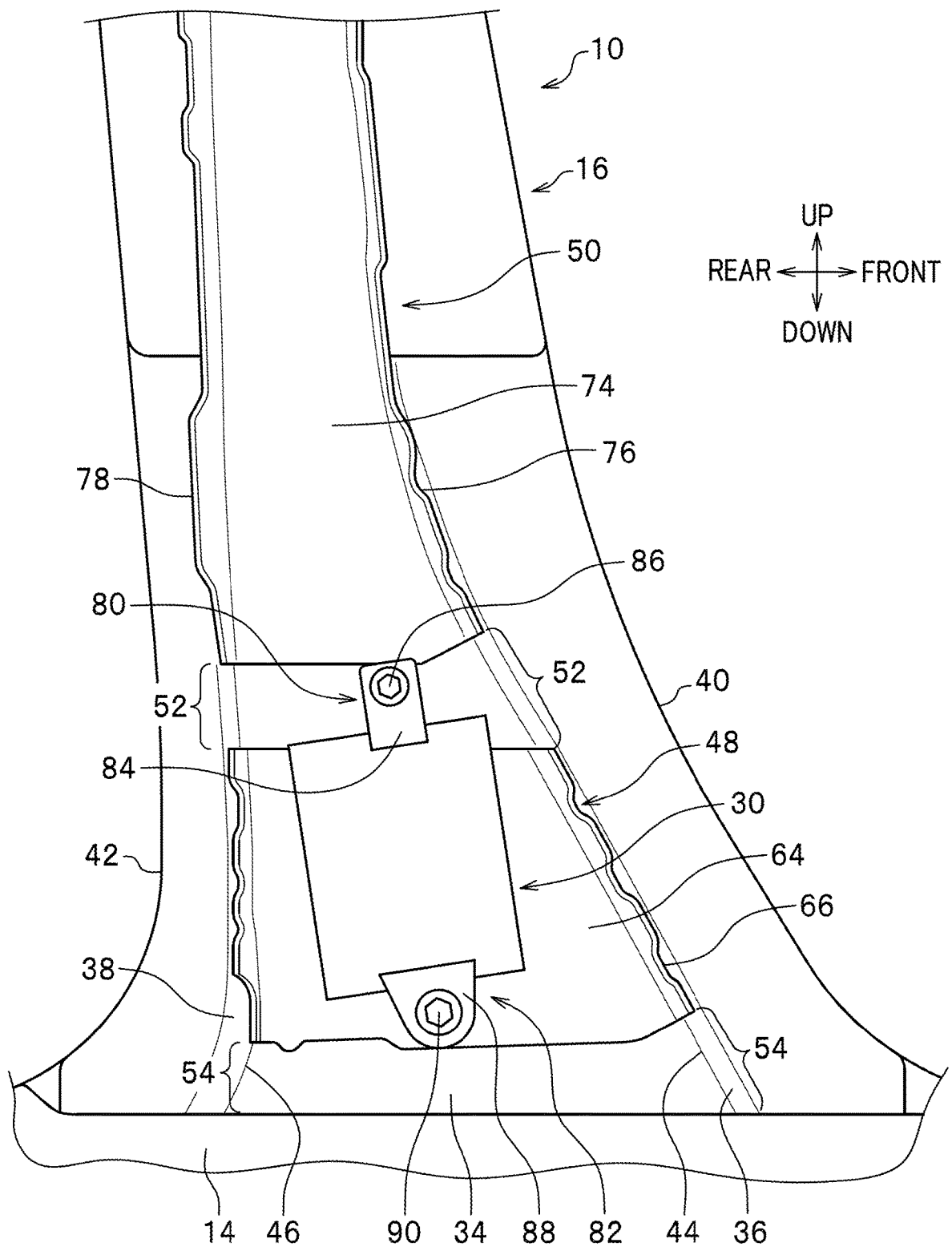
FIG. 2 is a partially enlarged side view showing the center pillar shown in FIG. 1 with a pillar inner removed.

As shown in FIGS. 2 and 3, the pillar outer 16 includes: a side wall 34 extending in the vehicle up-down direction; a front wall 36 bending from the vehicle front end of the side wall 34 inward in the vehicle width direction; a rear wall 38 bending from the vehicle rear end of the side wall 34 inward in the vehicle width direction; the front flange 40 extending from the inner end, in the vehicle width direction, of the front wall 36 toward the vehicle front and joined to the pillar inner 18 (the front flange 26); and the rear flange 42 extending from the inner end, in the vehicle width direction, of the rear wall 38 toward the vehicle rear and joined to the pillar inner 18 (the rear flange 28).

The pillar outer 16 is provided with a front ridge line portion 44 at a border portion between the front wall 36 and the side wall 34. This front ridge line portion 44 is provided curving to the vehicle front side largely as it extends from the upper side to the lower side of the center pillar 10. The pillar outer 16 is also provided with a rear ridge line portion 46 between the rear wall 38 and the side wall 34. This rear ridge line portion 46 is provided curving slightly to the vehicle rear side as it extends from the upper side to the lower side of the center pillar 10. The front ridge line portion 44 and the rear ridge line portion 46 function as the "ridge line portion" described in the scope of claims.

As shown in FIG. 2, a first reinforcement member 48 and a second reinforcement member 50 are disposed at the pillar outer 16, the first reinforcement member 48 being disposed at a position coinciding with the retractor 30 in a side view and the second reinforcement member 50 being disposed higher than the retractor 30. The first reinforcement member 48 and the second reinforcement member 50 are disposed apart from each other in the vehicle up-down direction.

A first deformation part 52 deformable upon input of side collision load is provided between the lower first reinforcement member 48 and the upper second reinforcement member 50. The first deformation part 52 is formed by a part (region) provided with no reinforcement member and deforms upon input of side collision load more easily than parts (regions) provided with the reinforcement members. The first deformation part 52 is formed by a region extending in the vehicle front-rear direction between the first reinforcement member 48 and the second reinforcement member 50 in a side view.

As shown in FIG. 2, the pillar outer 16 is also provided with a second deformable part 54 deformable upon input of side collision load, between the first reinforcement member 48 and the side sill 14 apart from each other in the vehicle up-down direction. This second deformable part 54 is formed by a part (region) provided with no reinforcement member and deforms upon input of side collision load more easily than parts (regions) provided with the reinforcement members. The second deformable part 54 is formed by a region extending in the vehicle front-rear direction between a lower end portion of the first reinforcement member 48 and an upper end portion of the side sill 14 in a side view.

Figure 5:
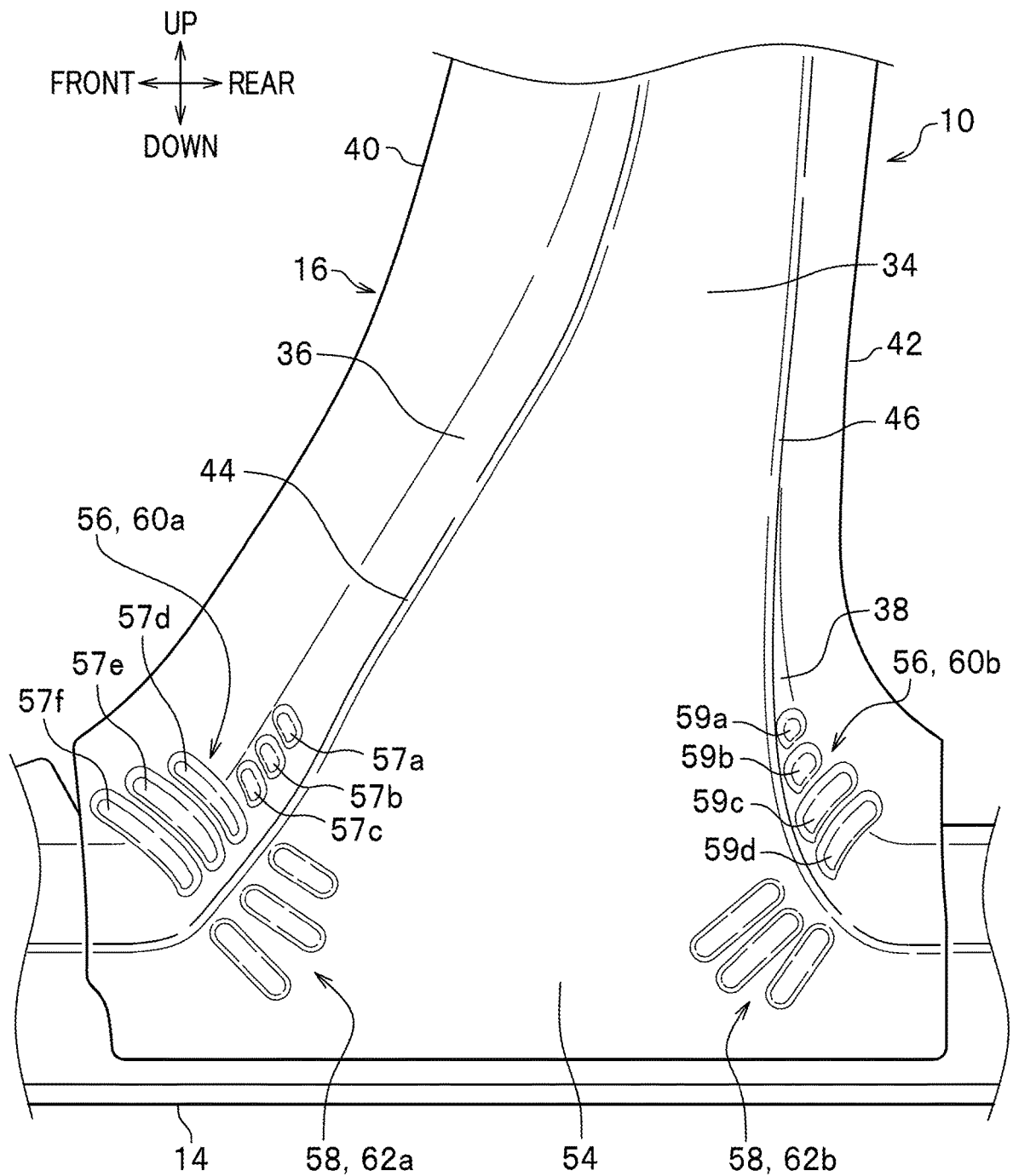
FIG. 5 is a side view showing a second deformation part where a plurality of beads are provided at a pillar outer.

As shown in FIG. 5, the second deformable part 54 is configured including a plurality of first beads 56 disposed at each of the front wall 36 and the rear wall 38 of the pillar outer 16 and a plurality of second beads 58 disposed at the side wall 34 of the pillar outer 16. These first beads 56 include front first beads 60a disposed at the front wall 36 of the pillar outer 16 and rear first beads 60b disposed at the rear wall 38 of the pillar outer 16. Also, the second beads 58 include front second beads 62a disposed at a vehicle front portion of the side wall 34 of the pillar outer 16 and rear second beads 62b disposed at a vehicle rear portion of the side wall of the pillar outer 16.

Hereinbelow, the front first beads 60a and the rear first beads 60b are described simply as the "first beads 56" when both of them are included, and the front second beads 62a and the rear second beads 62b are described simply as the "second beads 58" when both of them are included.

Although the first beads 56 and the second beads 58 provided at the pillar outer 16 are each formed by a recess portion recessed toward the pillar inner 18 in the present embodiment, they are not limited to this and may be formed by, for example, bump portions protruding outward.

As shown in FIG. 5, the first beads 56 (the front first beads 60a and the rear first beads 60b) and the second beads 58 (the front second beads 62a and the rear second beads 62b) are disposed in such a manner as to sandwich the ridge line portions (the front ridge line portion 44 and the rear ridge line portion 46) linking the side wall 34 to the front wall 36 and the rear wall 38, respectively.

The front first beads 56 are formed by three beads 57a to 57c disposed at the upper side and three beads 57d to 57f disposed therebelow. The rear first beads 60b are formed by two beads 59a, 59b disposed at the upper side and two beads 59c, 59d disposed below the beads 59a, 59b. The longitudinal lengths of the first beads 56 are set so that the lower beads 57d to 57f may be longer than the upper beads 57a to 57c. The second beads 58 are disposed to face the lower ones of the first beads 56, namely the beads 57d to 57f, 59c, and 59d, with the ridge line portions (the front ridge line portion 44 and the rear ridge line portion 46) in between.

As shown in FIG. 3, a cross section of the first reinforcement member 48 taken in the vehicle front-rear direction has an angular letter U shape. Also, the first reinforcement member 48 is configured including an outer wall 64 formed along the side wall 34 of the pillar outer 16 and a front leg wall 66 and a rear leg wall 68 formed along the front wall 36 and the rear wall 38 of the pillar outer 16, respectively, and forms an opening that opens inward in the vehicle width direction. The front leg wall 66 and the rear leg wall 68 together function as the "leg wall" in the scope of the claims.

Further, the leg walls of the first reinforcement member 48 (the front leg wall 66 and the rear leg wall 68) include joint points 70 joined to the front wall 36 and the rear wall 38 of the pillar outer 16, respectively, and third beads 72 extending in the vehicle width direction between the joint points 70 (see FIGS. 6A to 6C). The first reinforcement member 48 is integrally joined to the pillar outer 16 by being welded at the joint points 70 by, for example, spot welding or the like. The third beads 72 are formed by recess portions recessed inward relative to the joint points 70 in a side view.

The second reinforcement member 50 substantially has an angular letter U shape in a cross section taken in the vehicle front-rear direction and extends in the up-down direction (see FIG. 1). Also, as shown in FIG. 2, the second reinforcement member 50 is configured including: a relatively long outer wall portion 74 formed along the side wall 34 of the pillar outer 16; and a front wall portion 76 and a rear wall portion 78 formed along the front wall 36 and the rear wall 38 of the pillar outer 16, respectively, and forms an opening that opens inward in the vehicle width direction. Although the upper end portion of the second reinforcement member 50 terminates at a middle portion of the center pillar 10 as shown in FIG. 1, the present disclosure is not limited to this. For example, the second reinforcement member 50 extends to a position near and short of the roof side rail 12 at an upper part of the vehicle body or is directly linked to the lower side of the roof side rail 12.

Figure 4:
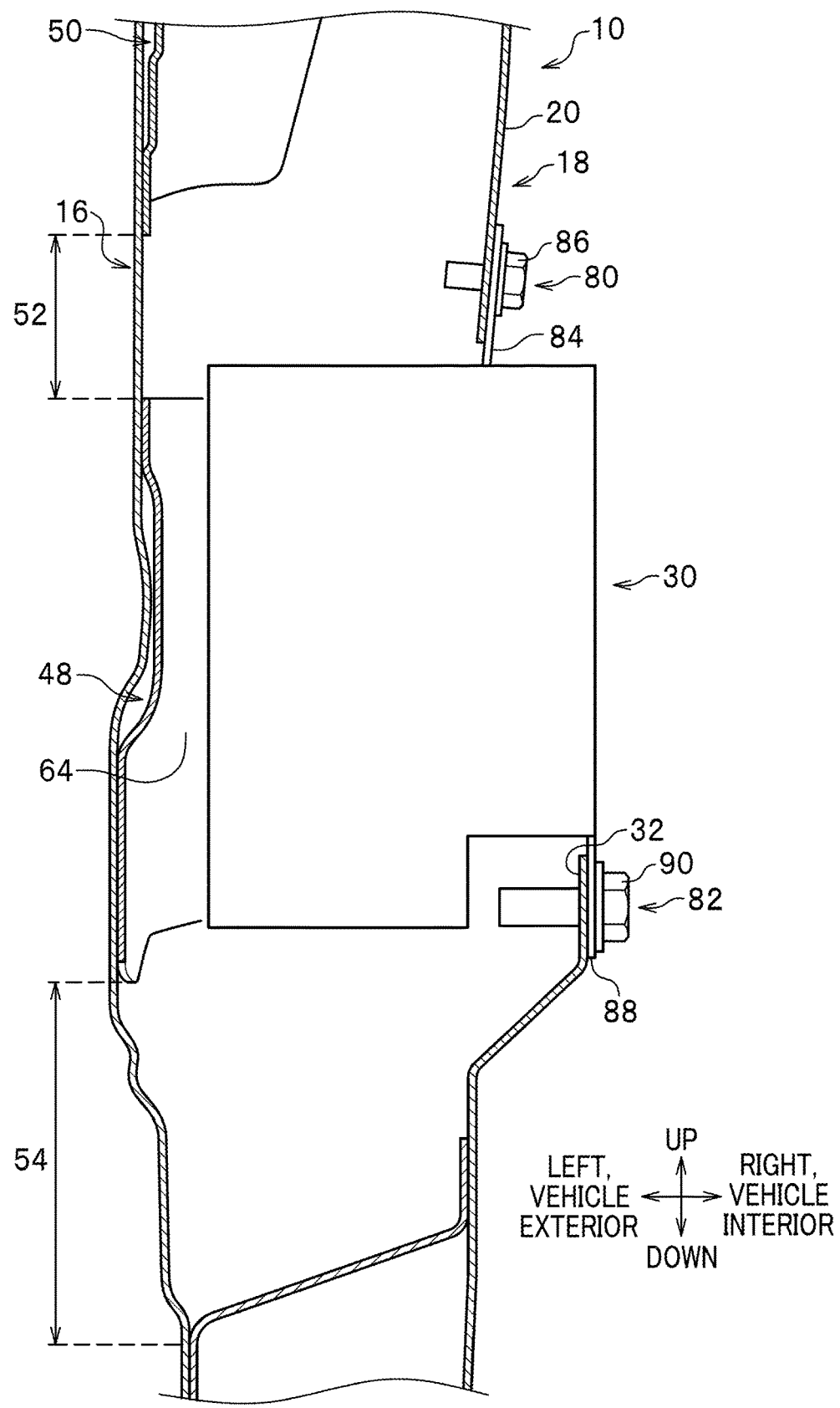
FIG. 4 is a longitudinal sectional view taken along the axis direction of the center pillar, showing a part where the retractor is disposed.

The pillar inner 18 includes a retractor attachment mechanism to which the retractor 30 is attached. As shown in FIG. 4, this retractor attachment mechanism is formed by an upper attachment portion (retractor attachment portion) 80 and a lower attachment portion 82. The upper attachment portion 80 is disposed higher than the first reinforcement member 48 in the vehicle up direction and is fastened to the pillar inner 18 by a bolt 86 with the interposition of an upper bracket 84 linked to the retractor 30. The lower attachment portion 82 is located at the level of a lower portion of the first reinforcement member 48 and is fastened to the pillar inner 18 by a bolt 90 with the interposition of a lower bracket 88 linked to the retractor 30.

The retractor 30 is an apparatus that enables a seatbelt (not shown) for fastening an occupant to the seat to be drawn in and out. The retractor 30 is configured to operate to draw a seatbelt in with a predetermined draw-in force such that an occupant can draw out the seat belt in normal times, and also, if the vehicle body or the seatbelt undergoes acceleration of a predetermined value or more, such as hard braking or collision, the retractor 30 serves a function to secure the seatbelt so that the seatbelt will not be drawn out further.

The center pillar 10 employing the pillar construction according to the present embodiment is basically configured as described above, and advantageous effects offered thereby are described next.

The first reinforcement member 48 and the second reinforcement member 50 are disposed at the pillar outer 16 of the center pillar 10 of the present embodiment, the first reinforcement member 48 being disposed at a position coinciding with the retractor 30 in a side view and the second reinforcement member 50 being disposed higher than the retractor 30. The first reinforcement member 48 and the second reinforcement member 50 are disposed apart from each other in the vehicle up-down direction. The first deformation part 52 deformable upon input of side collision load is provided between the first reinforcement member 48 and the second reinforcement member 50.

Figure 7A:
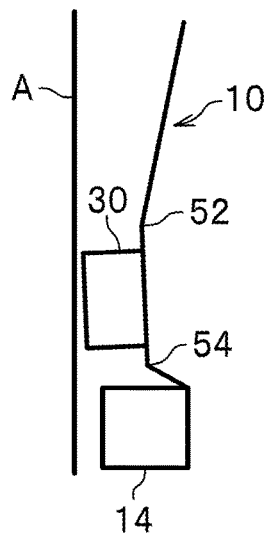
FIGS. 7A and 7B are schematic diagrams showing how the center pillar of the present embodiment deforms in response to input of side collision load.
Figure 7B:
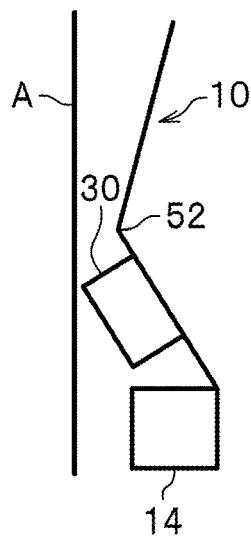

Thus, in the present embodiment, side collision load inputted to the center pillar 10 is supported by the second reinforcement member 50, and at the same time, a point of bend located most inward into the vehicle interior is set at the first deformation part 52 higher than the retractor 30. Thus, the amount of displacement of the retractor 30 to the vehicle interior inner side is reduced (see FIG. 7B).

Figure 7C:
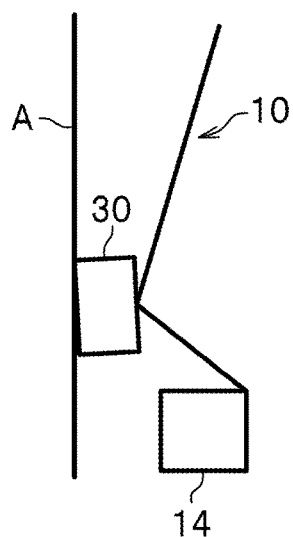
FIG. 7C is a schematic diagram showing how a center pillar according to a comparative example deforms in response to input of side collision load.

By contrast, in a comparative example provided with no first deformation part 52 of the present embodiment, in response to side collision load inputted to the center pillar 10, the center pillar 10 bends and deforms at the position where the retractor 30 is disposed (see FIG. 7C). Note that in FIGS. 7A to 7C, the solid line A denotes a reference line at the vehicle interior inner side set by the Applicant. In the comparative example shown in FIG. 7C, a side surface of the retractor 30 at the vehicle interior inner side reaches the reference line A, whereas in the present embodiment shown in FIG. 7B, the bending at the first deformation part 52 creates a horizontal clearance between a corner portion of the retractor 30 and the reference line A, and the amount of displacement of the retractor 30 to the vehicle interior inner side is reduced by the length of this clearance.

Also, in the present embodiment, a lower end portion of the center pillar 10 is linked to the side sill 14 extending in the vehicle front-rear direction. Between the first reinforcement member 48 and the side sill 14 apart from each other in the vehicle up-down direction, the pillar outer 16 is also provided with the second deformable part 54 deformable upon input of side collision load.

Thus, in the present embodiment, the first deformation part 52 located higher than the retractor 30 and the second deformable part 54 located lower than the retractor 30 are allowed to bend and deform to the vehicle interior inner side upon input of side collision load. Consequently, in the present embodiment, an increased amount of side collision load is absorbed by the first deformation part 52 and the second deformable part 54 disposed above and below the retractor 30, reducing deformation to the vehicle interior inner side. As a result, in the present embodiment, the provision of a plurality of points of bend upon input of side collision load enables further reduction in the amount of displacement of the retractor 30 to the vehicle interior inner side. In the present embodiment shown in FIG. 7A, the bend point formed by the first deformation part 52 and the bend point formed by the second deformable part 54 reduce the amount of displacement of the retractor 30 to the vehicle interior inner side and thereby create a clearance between the reference line A and the retractor 30.

Further, in the present embodiment, the second deformable part 54 is configured including: the plurality of first beads 56 disposed at the front wall 36 and the rear wall 38 of the pillar outer 16; and the plurality of second beads 58 disposed at the side wall 34 of the pillar outer 16. The first beads 56 and the second beads 58 are disposed such that the ridge line portions (the front ridge line portion 44 and the rear ridge line portion 46) linking the side wall 34 to the front wall 36 and the rear wall 38 intervene between the first beads 56 and the second beads 58.

Thus, in the present embodiment, upon input of side collision load, the center pillar 10 bends and deforms at a portion lower than the retractor 30 even more, and the bending deformation is done in corporation with the first deformation part 52 higher than the retractor 30, so that the amount of side collision load absorbed is increased, reducing the amount of displacement to the vehicle interior inner side. Also, the first beads 56 and the second beads 58 are disposed such that the ridge line portions (the front ridge line portion 44 and the rear ridge line portion 46) intervene between the first beads 56 and the second beads 58. This provides rigidity against a certain level of side collision load, and also, the first beads 56 and the second beads 58 facilitate deformation upon input of excessive side collision load.

Furthermore, in the present embodiment, the longitudinal lengths of the first beads 56 are set so that the lower beads 57d to 57f are longer than the upper beads 57a to 57c. The second beads 58 are disposed to face the beads 57d to 57f, 59c, and 59d that are the lower ones of the first beads 56 with the ridge line portions (the front ridge line portion 44 and the rear ridge line portion 46) in between.

Thus, in the present embodiment, the lower ones of the first beads 56 (the beads 57d to 57f) are set to be longer than the upper ones of the first beads 56 (the beads 57a to 57c), and the second beads 58 are disposed to face the lower ones of the first beads 56. This further allows a portion below the retractor 30 to bend. Also, in the present embodiment, the bending is done in cooperation with the first deformation part 52 located higher than the retractor 30, increasing the amount of side collision load absorbed and thus reducing the amount of displacement to the vehicle interior inner side.

Further, because the center pillar 10 has more than one bend point that bends upon input of side collision load (see FIG. 7A) rather than having only one such bend point (see FIG. 7B), the present embodiment reduces the amount of displacement (projection) of the retractor 30 to the vehicle interior inner side. Furthermore, in the present embodiment the lengths of the first beads 56 are set so that the lower ones of the first beads 56 are longer than the upper ones of the first beads 56. This allows stress produced by deformation of the center pillar 10 to be distributed to the upper side and to the lower side, which makes it less likely for the center pillar to crack upon deformation.

Furthermore, in the present embodiment, the first reinforcement member 48 is configured including: the outer wall 64 formed along the side wall 34 of the pillar outer 16; and the front leg wall 66 and the rear leg wall 68 formed along the front wall 36 and the rear wall 38 of the pillar outer 16, respectively, forming an opening that opens inward in the vehicle width direction. The front leg wall 66 and the rear leg wall 68 include the plurality of joint points 70 joined to the front wall 36 and the rear wall 38 of the pillar outer 16, respectively, and the third beads 72 extending in the vehicle width direction between the joint points 70, 70 adjacent in the up-down direction.

In the present embodiment, the front leg wall 66 and the rear leg wall 68 of the first reinforcement member 48 are provided with not only the joint points 70 joined to the front wall 36 and the rear wall 38 of the pillar outer 16 but also the third beads 72. Thereby, the first reinforcement member 48 is prevented from detaching from the pillar outer 16 upon input of side collision load, and also, the third beads 72 improves the rigidity of the region where the retractor 30 is disposed. As a result, the present embodiment ensures that the first deformation part 52 and the second deformable part 54 disposed above and below the first reinforcement member 48 deform upon input of side collision load.

Furthermore, in the present embodiment, the pillar inner 18 includes the upper attachment portion 80 (the retractor attachment portion) to which the retractor 30 is attached. This upper attachment portion 80 (the retractor attachment portion) is disposed higher than the first reinforcement member 48 in the vehicle up direction.

In the present embodiment in which the upper attachment portion 80 is provided above the first reinforcement member 48, when the retractor 30 is pushed by the first reinforcement member 48 upon input of side collision load, the pillar inner 18 reduces displacement of the retractor 30 to the vehicle interior inner side. Also, in the present embodiment, side collision load inputted to the retractor 30 is transmitted to the pillar inner 18, and the improved rigidity of the center pillar 10 increases the amount of energy of the side collision load absorbed.

Next, a center pillar 10a employing a pillar construction according to a different embodiment of the present disclosure is described below. Note that the same constituents as those in the above embodiment are denoted by the same reference numerals as those used in the above embodiment to omit their detailed descriptions.

The pillar outer 16 of the center pillar 10a according to the different embodiment is configured including a third reinforcement member 92 linking an upper end portion of the first reinforcement member 48 and a lower end portion of the second reinforcement member 50 to each other, lying over the first deformation part 52 in the up-down direction. The third reinforcement member 92 substantially has an angular letter U shape in a cross section taken in the vehicle front-rear direction and extends in the up-down direction.

The third reinforcement member 92 has notch portions 94 at positions coinciding with the first deformation part 52 in a side view. These notch portions 94 are formed by a front notch portion 96a disposed at the vehicle front side and a rear notch portion 96b disposed at the vehicle rear side. The front notch portion 96a is provided slanting to the vehicle front side as it extends from up to down. The rear notch portion 96b is provided to extend substantially in the up-down direction. Also, the front notch portion 96a and the rear notch portion 96b are disposed to face each other in the vehicle front-rear direction.

The front notch portion 96a and the rear notch portion 96b include parts of the front ridge line portion 44 and the rear ridge line portion 46 of the pillar outer 16, respectively, and a part of the first deformation part 52 is visible through the notch portions 94 from the inner side in the vehicle width direction.

In the center pillar 10a according to the different embodiment, the third reinforcement member 92 disposed to lie over the first deformation part 52 includes the notch portions 94 (the front notch portion 96a and the rear notch portion 96b) at positions coinciding with the first deformation part 52. Thereby, the rigidity of the center pillar 10a is raised.

Figure 8:
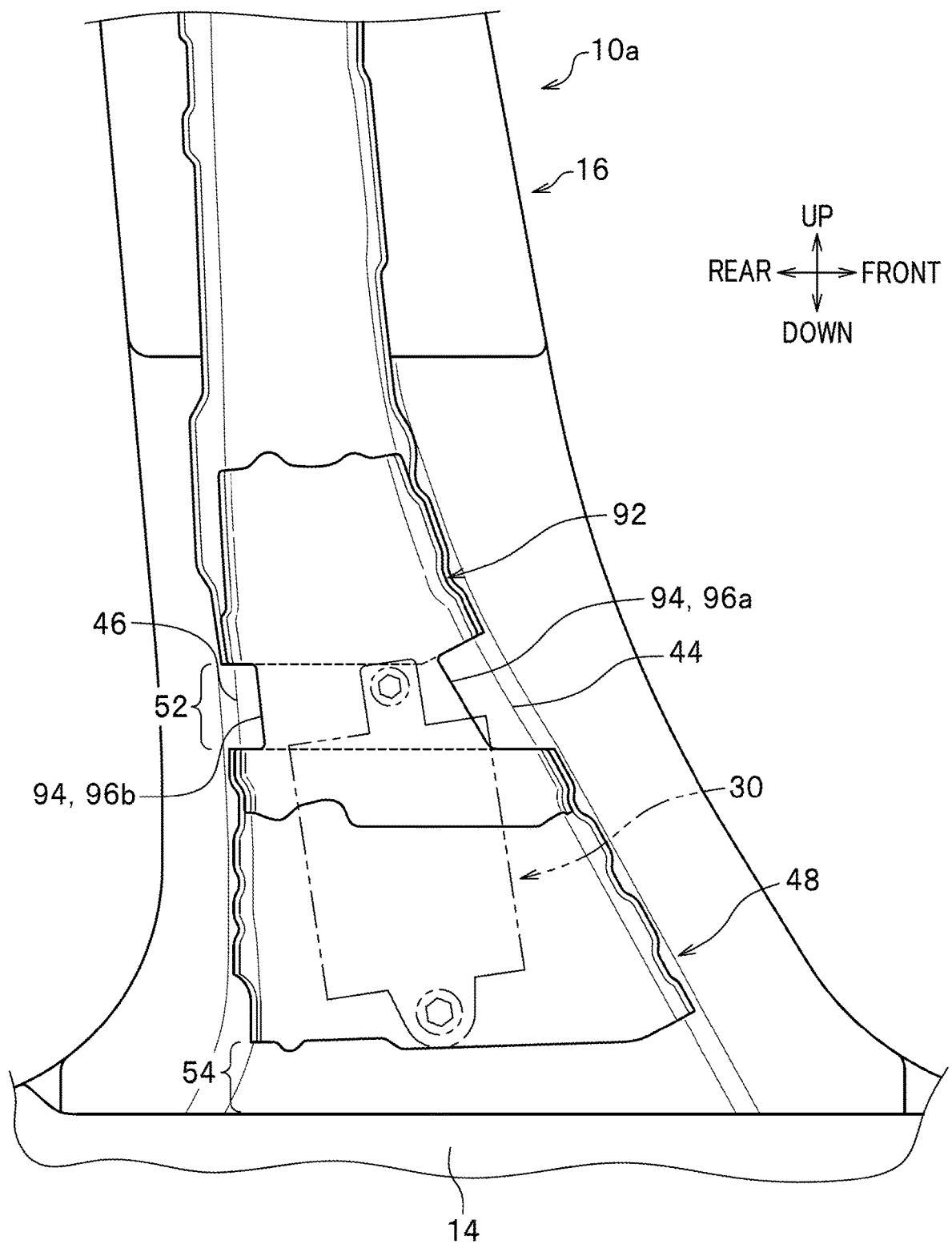
FIG. 8 is a partially transparent side view of a center pillar employing a pillar construction according to a different embodiment of the present disclosure as seen from the vehicle interior inner side.

Also, upon input of excessive side collision load, the center pillar 10a according to the different embodiment is allowed to deform at the notch portions 94 and the first deformation part 52 that are higher than the retractor 30 (see the broken line in FIG. 8) and thus reduces the amount of displacement of the retractor 30 to the vehicle interior inner side.

What is claimed is:
1. A pillar construction comprising:
a pillar including a pillar inner and a pillar outer forming a closed cross section;
a retractor disposed at a lower portion of the pillar; and
a first reinforcement member and a second reinforcement member disposed at the pillar outer, the first reinforcement member being disposed at a position coinciding with the retractor in a side view, the second reinforcement member being disposed higher than the retractor,
wherein the first reinforcement member and the second reinforcement member are disposed apart from each other in a vehicle up-down direction, and
wherein the pillar outer includes a first deformation part which is provided between the first reinforcement member and the second reinforcement member and deformable upon input of side collision load.
2. The pillar construction as claimed in claim 1,
wherein the pillar includes a lower end portion linked to a side sill extending in a vehicle front-rear direction,
wherein the side sill and the first reinforcement member are apart from each other in the vehicle up-down direction, and
wherein the pillar outer includes a second deformation part which is disposed between the side sill and the first reinforcement member and deformable upon input of side collision load.
3. The pillar construction as claimed in claim 2,
wherein the second deformation part comprises:
at least one first bead disposed on at least one of a front wall and a rear wall of the pillar outer; and
at least one second bead disposed on a side wall of the pillar outer,
wherein the side wall and the front wall are linked by a first ridge line portion,
wherein the side wall and the rear wall are linked by a second ridge portion, and
wherein the at least one first bead and the at least one second bead are disposed such that at least one ridge line portion of the first ridge line portion and the second ridge line portion intervenes between the at least one first bead and the at least one second bead.

4. The pillar construction as claimed in claim 3,
wherein the at least one first bead includes an upper first bead and a lower first bead disposed lower than the upper first bead,
wherein the at least one first bead is set in longitudinal length such that the lower first bead is longer than the upper first bead, and
wherein the at least one second bead faces the lower first bead with the at least one ridge line portion intervening between the at least one second bead and the lower first bead.

5. The pillar construction as claimed in claim 3,
wherein the first reinforcement member comprises:
an outer wall formed along the side wall of the pillar outer and forming an opening that opens inward in a vehicle width direction; and
at least one leg wall formed along the at least one of the front wall and the rear wall of the pillar outer,
wherein the at least one leg wall includes: a first joint point and a second joint point joined to the at least one of the front wall and the rear wall; and a third bead extending between the first joint point and the second joint point in the vehicle width direction.

6. The pillar construction as claimed in claim 1,
wherein the pillar inner includes a retractor attachment portion to which the retractor is attached, and
wherein the retractor attachment portion is disposed higher than the first reinforcement member in a vehicle up direction.

7. The pillar construction as claimed in claim 1,
wherein the pillar outer includes a third reinforcement member which lies over the first deformation part and links the first reinforcement member and the second reinforcement member to each other, and
wherein the third reinforcement member includes a notch portion at a position coinciding with the first deformation part in a side view.

* * * * *